US005768830A

United States Patent [19]
Kelly

[11] Patent Number: 5,768,830
[45] Date of Patent: Jun. 23, 1998

[54] SUPPORT FOR CONSTRUCTION MATERIAL

[76] Inventor: Kevin J. Kelly, P.O. Box 1573, Rancho Cordova, Calif. 95741

[21] Appl. No.: 732,689

[22] Filed: Oct. 18, 1996

[51] Int. Cl.⁶ .............................. E02D 35/00; E04B 1/00; E04G 21/14

[52] U.S. Cl. ...................... 52/127.1; 52/127.8; 52/127.5; 52/127.11; 52/127.7; 52/127.2; 269/231; 269/91; 269/904

[58] Field of Search ................................ 52/127.8, 127.5, 52/127.11, 127.7, 127.2; 269/91, 904, 203, 900, 37, 542, 231

[56] References Cited

U.S. PATENT DOCUMENTS

| | | | |
|---|---|---|---|
| 4,093,202 | 6/1978 | Kincaid | 269/904 X |
| 4,164,346 | 8/1979 | Sickler | 269/904 X |
| 5,611,189 | 3/1997 | Fleck | 269/904 X |

*Primary Examiner*—Carl D. Friedman
*Assistant Examiner*—W. Glenn Edwards
*Attorney, Agent, or Firm*—Richard C. Litman

[57] ABSTRACT

A support for construction material provides for the temporary support of elongate materials during construction projects or storage of the materials. The device comprises a generally U-shaped frame having a flat, planar base and opposite parallel planar arms extending upwardly and generally normal to the base. Each arm includes an elongate slot therein, with an axle having a series of rollers thereon, adjustably installed in the slots. One of the arms includes an additional roller at the uppermost end thereof, with its axis normal to the adjustable rollers extending between the arms. The opposite arm includes at least two nail slots, adapted to receive partially driven nails so the device may be temporarily suspended during use. The present support is used by driving a pair of nails into the building structure (rafter end or previously installed fascia board), hanging the support from the nails, adjusting the rollers to the proper height between the arms, and placing one end of the elongate material (rain gutter, etc.) on the rollers. A single worker may accomplish the above, and then install the opposite end of the gutter or other material while the present support holds the first end at the proper height. The present support may also be used to support articles by using a tripod or the like, or to support articles in storage while suspended from a wall, by using a mounting bracket which may be temporarily secured to the support, thus further increasing its versatility.

15 Claims, 5 Drawing Sheets

SUPPORT FOR CONSTRUCTION MATERIAL

BACKGROUND OF THE INVENTION

1. Field of the Invention

The present invention relates generally to holders, brackets, supports, and the like, and more specifically to a support for construction material which is particularly adapted to be secured temporarily to another structure and to provide support for one end of an elongate article, either for storage or installation or other work on the article. The support comprises a generally U-shaped frame having a plurality of adjustable rollers therein, with an arm which is removably attachable to another article (building structure or fitting). The support provides not only for the storage of elongate articles, but also enables a single worker to install elongate articles (gutters, fascia boards, etc.) without needing an assistant.

2. Description of the Prior Art

Traditionally, the installation of elongate construction materials such as rain gutters, fascia board, siding, etc., has required at least two persons to support the opposite ends of the elongate article. Accordingly, various devices, from a simple nail temporarily driven into the structure, to more complex supports, have been developed by those in the building construction trade, as will be described further below.

However, most of these prior art supports are either relatively complex, do not provide the versatility of the present support for various sizes and shapes of materials, do not provide the security of attachment of the present support, are limited in their attachment means to a building or other structure, and/or do not provide sufficient protection for the material being supported thereby. Accordingly, a need will be seen for a support for construction materials which responds to all of the above noted deficiencies in a single, relatively simple yet elegant device. A discussion of the prior art of which the present inventor is aware, and its specific differences from the present invention, is provided immediately below.

U.S. Pat. No. 4,314,429 issued on Feb. 9, 1982 to Ernest Casteel et al. describes a Siding Holder generally comprising an inverted J-shaped bracket which hooks over the top of an uppermost installed siding board, and a second bracket which is adjustably secured to the first bracket to support a higher siding board being installed. No rollers are provided to ease the lateral movement of a board within the holder, thus risking damage to the material resting within the holder should some lateral adjustment be required. The device is not sufficiently wide to hold wider articles such as rain gutters and the like, and no provision is made for securing the holder directly to the building structure beneath the siding or for using the device for the storage of elongate articles, as provided by the present support.

U.S. Pat. No. 4,600,183 issued on Jul. 15, 1986 to James R. Ogden describes a Building Panel Installation Device comprising a Z-shaped bracket which is hooked removably over a structural member. Height adjustment of a construction member placed on the bracket is provided by a curved plate which is hinged to one edge of the lower portion of the bracket. A screw passes through the lower portion of the bracket to contact the underside of the plate for the adjustment thereof. No outer retaining wall is provided on the device, and it would appear that construction material placed upon the device could easily slip off, particularly if the adjustment plate is raised to any degree. Accordingly, the device is not amenable to use with wider materials, such as gutters and the like. No means is provided for use of the device for the storage of elongate articles in a vehicle or other storage area, which means is provided by the structure of the present support.

U.S. Pat. No. 4,786,038 issued on Nov. 22, 1988 to Frank A. Ammons describes a Hanger's Helper Tool, comprising a jack mechanism (screw, ratchet, etc., in different embodiments) which is clamped to a stud using a C-clamp type mechanism. A generally U-shaped support is mounted atop the jack mechanism, to support the edge of a wallboard panel. Again, the device does not provide for the lateral movement of materials thereon, and forcing materials laterally in the device for adjusting their position, could scar the lower edge thereof. Moreover, the C-clamp arrangement used to secure the device to the building structure, is prone to slippage, unlike the secure temporary attachment used for the present device.

U S. Pat. No. 4,826,390 issued on May 2, 1989 to Ronald Paxton describes a Sheet Handling Apparatus, comprising a pair of interconnected lateral braces which fit beneath a wallboard or ceiling panel sheet. The braces may be pivoted to a horizontal position to raise the supported panel immediately beneath the ceiling structure, to enable one person to secure the panel to the ceiling structure. The extremely wide width (i. e., over four feet) required to hold such a panel, and the need for two braces, as well as the pivotal operation and clamping arrangement of the device, render it unsuitable for use as a support for gutter work and the like.

U.S. Pat. No. 4,836,517 issued on Jun. 6, 1989 to Carl M. Vossler describes a Fascia Board Installing Apparatus, comprising a generally U-shaped bracket for holding the fascia board and an orthogonal rectangular bracket serving to secure the apparatus to the end of a rafter or the like. Screw clamps are used to secure the device to the roof structure, which clamps are more prone to slippage than the securing means used for the present support, as noted further above. Moreover, the rectangular component which secures completely around a rafter or other structural member, requires a releasable side member so the component may be removed from the structure after the fascia board has been installed, as the device cannot be removed past the end of the rafter once the board has been nailed in place. Also, for the same reason the device cannot be used once the roof sheathing has been installed, thus requiring the fascia to be installed before the roof sheathing.

U.S. Pat. No. 4,899,459 issued on Feb. 13, 1990 to Andrew W. Taggart describes a Siding Application Tool, comprising a sheet metal or wire bracket which is installed permanently in place on the structure before the siding is installed. The device includes a plurality of evenly spaced arms which are used to support each siding board as they are progressively installed, or to define the position of the upper edge of each siding board. As the device must remain in position beneath the siding once the siding has been installed, it is by definition disposable, as it cannot be reused in another siding project. Accordingly, no adjustability, removability, or means for laterally rolling an article supported thereby, are disclosed by Taggart, which features are all provided by the present support.

U.S. Pat. No. 5,088,682 issued on Feb. 18, 1992 to Ronald F. Gibbs describes a Facia Installation Holder, comprising a pair of generally L-shaped brackets adjustably secured together to provide parallel legs for the support of a fascia board. The upper leg is nailed to the roof adjacent the eaves, to secure the device in place. The device is somewhat cumbersome to use, as it supports the fascia board from above, rather than supporting the elongate article from below, as in the present support. Thus, either the fascia board must be carefully inserted between the upper and lower legs of the device, or the lower leg of the device must be secured to the upper leg while supporting the fascia board, with each procedure being relatively cumbersome and difficult in comparison to the use of the present support.

U.S. Pat. No. 5,240,234 issued on Aug. 31, 1993 to Stanley M. Lee describes a Clamp-On Gutter Holder, comprising an elongate support component formed to fit the cross sectional shape of a rain gutter, with the support component having a clamp similar to a gluing clamp or the like attached thereto. The clamp is positioned to clamp to each side of a fascia board, and thus cannot be used where there is no fascia board installed, or where a soffit has been installed beneath the rafter eaves. The clamp means used to secure the device to the fascia board is also prone to slippage, as in other clamp type attachments discussed further above, unlike the positive securing means provided by nailing the present support in place.

U.S. Pat. No. 5,319,909 issued on Jun. 14, 1994 to David S. Singleterry describes a Tool For Lap Siding Installation, comprising a gauge which is temporarily nailed in place immediately above the siding panels being installed. The gauge includes siding board support ridges to hold the siding in place until it is nailed. However, the ridges of the device are much too narrow to support a rain gutter or the like, and do not provide guidance and support on three sides, as is provided by the present support.

U.S. Pat. No. 5,522,149 issued on Jun. 4, 1996 to Glen A. Meyer describes a Siding Application And Gauge Tool, comprising a generally Z-shaped bar which is hooked over the uppermost secured siding board to support the next higher board for nailing. No means is provided to secure the device to the end of a rafter or the like, nor is three sided support provided for an article therein.

U.S. Pat. No. D-254,476 issued on Mar. 18, 1980 to Tyrell T. Gilb illustrates a design for an Architectural Post Base having a generally U-shape with a planar lateral support extending between the two legs of the U-shaped base. No roller means is provided for material supported therein, nor any means of removable attachment to another device, as provided by the present support.

U.S. Pat. No. D-356,166 issued on Mar. 7, 1995 to David V. Spiller illustrates a design for a Combined Locking Bracket And Pin For A Ladder. Again, the device comprises an essentially U-shaped primary component with a lateral crossmember which may be secured through any of a plurality of passages through the opposite legs of the U-shaped base. The relationship of the passages and the bottom of the U-shaped base are not suitable for positioning fascia boards or gutters for attachment to the eaves, even if the device were inverted. No roller means or temporary attachment means is shown.

Finally, Australian Patent Publication No. 464,694 published on Mar. 20, 1975 to Jack E. Lasscock describes Gutter Suspension Means, comprising a metal clip which attaches over the upper edge and back of a fascia to suspend a gutter permanently therefrom. The device is not suited for temporary use in either of its embodiments, and does not support the gutter (or other construction material) from beneath, as provided by the present support. No means is provided for attachment of the device to a structure other than a fascia, which means is provided by the present invention.

None of the above inventions and patents, either singly or in combination, is seen to describe the instant invention as claimed.

SUMMARY OF THE INVENTION

Accordingly, it is a principal object of the invention to provide an improved support for construction material which is adaptable for use as a temporary support for the installation of elongate materials such as gutters, fascia boards, and the like during construction, and which also provides for the support of such materials during storage.

It is another object of the invention to provide an improved support for construction materials which generally comprises a U-shaped frame having a plurality of vertically adjustable rollers disposed thereacross, which rollers provide for the lateral translation of materials through the support while precluding damage thereto.

It is a further object of the invention to provide an improved support which may include at least one roller disposed at the end of one arm of the device, serving as an additional low friction guide for materials supported therein.

An additional object of the invention is to provide an improved support which may be quickly and easily installed temporarily to an existing structure, and which may be quickly and easily removed from the structure when its use is no longer needed.

Still another object of the invention is to provide an improved support which may include one or more attachment brackets removably installable to the bottom and/or side(s) of the support, which brackets provide for the removable installation of the support on a tripod, wall mount, or other structure, as desired.

It is an object of the invention to provide improved elements and arrangements thereof in an apparatus for the purposes described which is inexpensive, dependable and fully effective in accomplishing its intended purposes.

These and other objects of the invention will become readily apparent upon review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
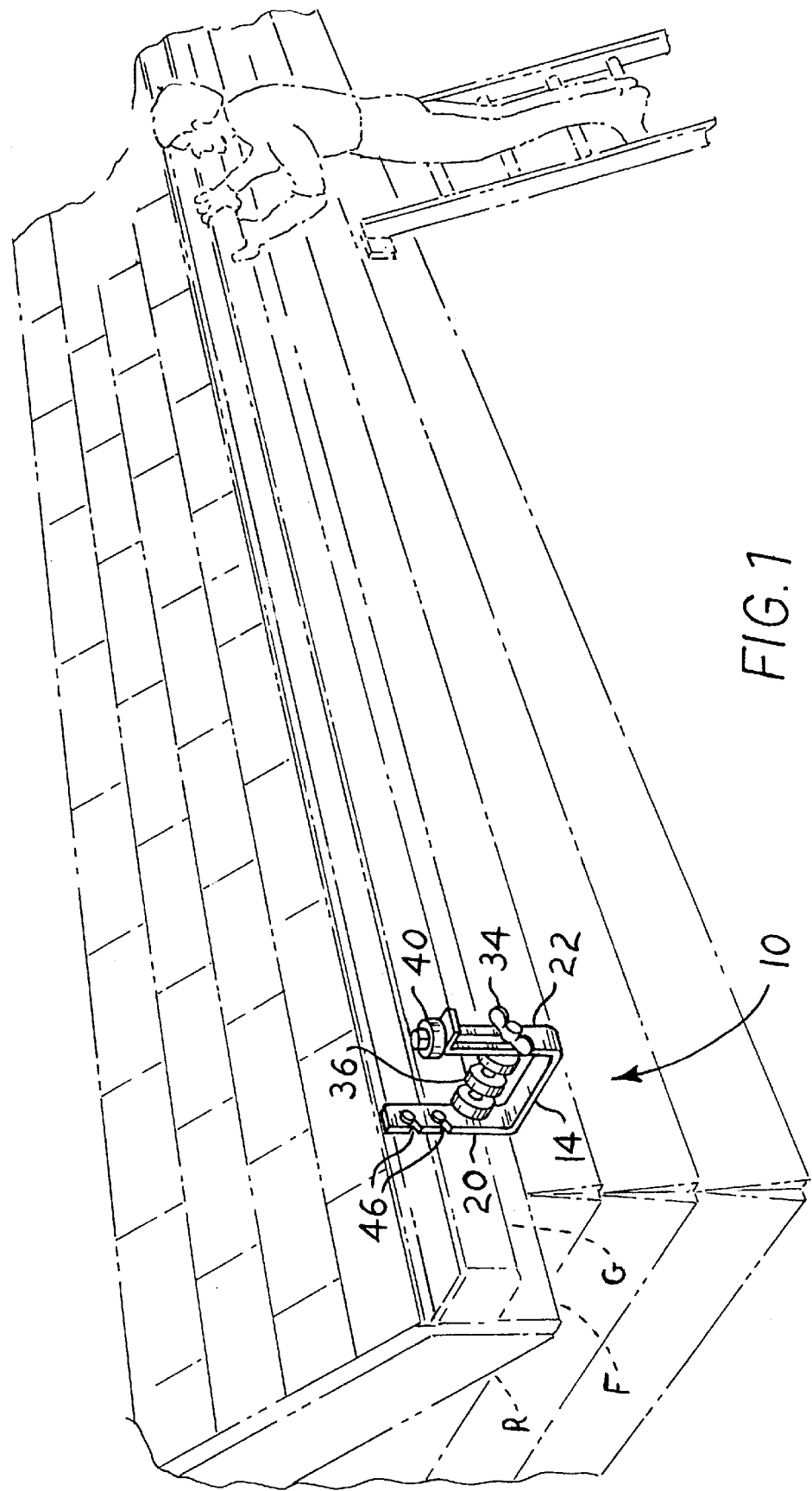
FIG. 1 is an environmental perspective view of the present support for construction materials in use, as it would be temporarily installed for the support of a rain gutter during installation thereof on a structure.
Figure 2:
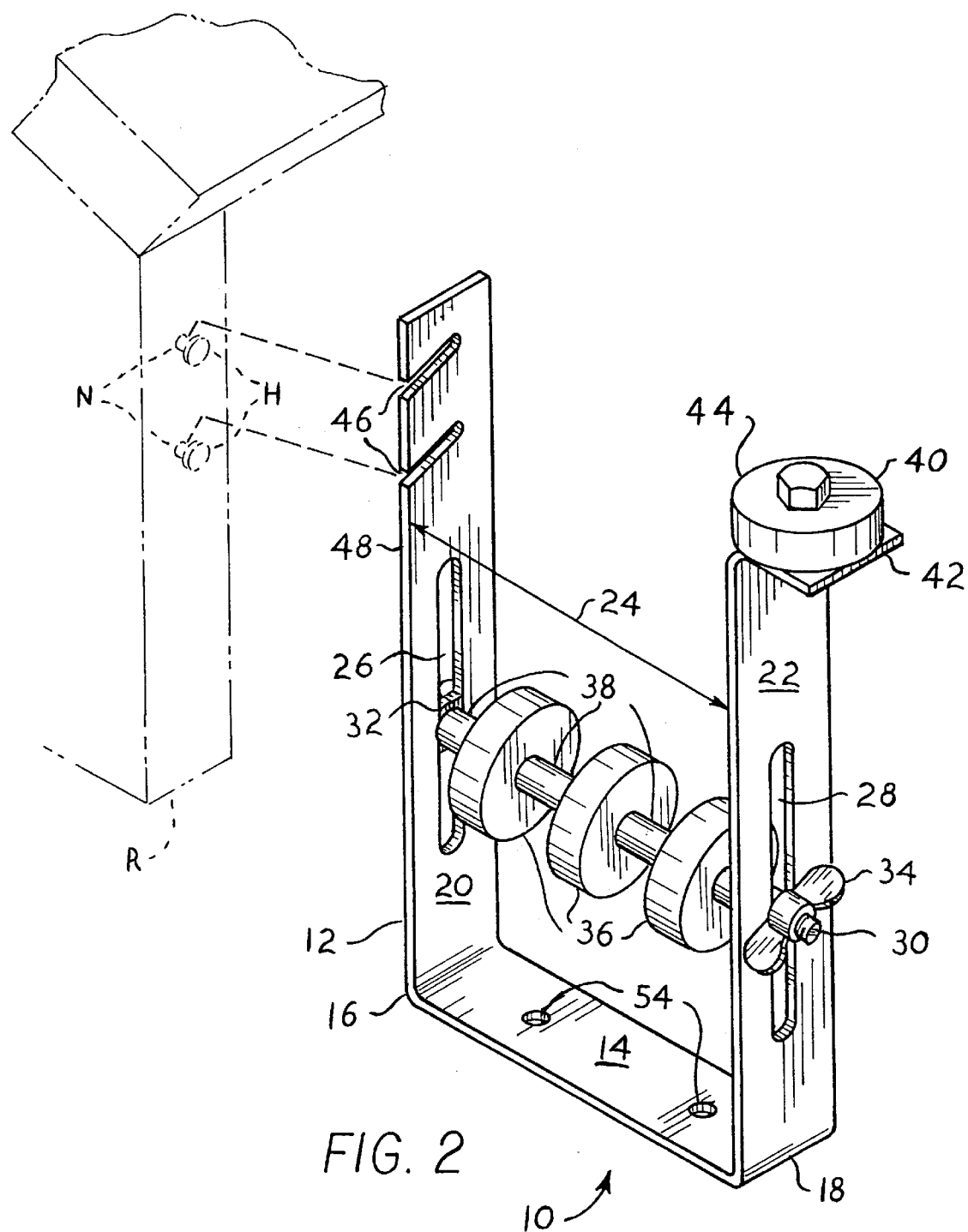
FIG. 2 is a detail perspective view of the present support, showing various details thereof and means used for the temporary and removable support of the device on a building structure.

Referring now particularly to FIGS. 1 and 2 of the drawings, the present invention will be seen to comprise a support for construction material, generally designated with the numeral 10. The support 10 may be used as shown in FIG. 1, to support one end of an elongate article of construction material (e. g., rain gutter G, etc.) being installed on a structure, permitting a single worker to do the installation and obviating need for additional personnel.

FIG. 2 discloses various details of the present construction material support 10. The support 10 includes a generally U-shaped frame 12, having a flat, planar base portion 14 with opposite first and second ends 16 and 18. A first and an opposite second frame arm, respectively 20 and 22, extend upwardly from the respective ends 16 and 18 of the base portion 14 and are generally parallel with one another, and thus define a construction material support channel 24 therebetween. It will be understood that while the above described base portion and frame arms are described as individual components connected together, that the entire frame 12 is preferably stamped or otherwise formed from a single, unitary piece of material, such as steel or other suitable material.

Each of the frame arms 20 and 22 includes an adjustment slot therein, respectively 26 and 28, with the adjustment slots 26/28 providing for the adjustment of the height of a construction material support member 30 relative to the frame base portion 14, which support member 30 is adjustably secured between the two parallel slots 26 and 28.

The support member 30 may comprise a carriage bolt or the like, having a square shoulder 32 which engages the sides of the first adjustment slot 26 to preclude the support member 30 from turning relative to the frame 12. The opposite end of the support member bolt 30 is threaded to accept a securing fastener of some sort, e. g., a wing nut 34 to preclude any requirement for additional tools or equipment to make adjustments of the support 30. Other types of fasteners may be substituted as desired.

A series of spaced apart rollers 36 is installed along the support member 30, providing a low friction means of moving elongate materials laterally through the channel 24 of the support 10. These rollers 36 are preferably of sealed ball bearing construction, in order to provide minimum rolling resistance, and are preferably more or less evenly spaced from one another and from the opposite frame arms 20 and 22, by means of a plurality of bushings 38 installed alternatingly with the rollers 36. Thus, a worker may loosen the wing nut 34 and adjust the material support assembly comprising the support member 30, rollers 36, and bushings 38, and adjust the assembly upwardly or downwardly as desired, depending upon the dimensions of the construction material being used. The wing nut 34 is then tightened to secure the support member 30 and components thereon, in place as desired. The bushings 38 provide compressive resistance to the tightening of the wing nut 34, to maintain the proper distance between the two frame arms 20 and 22, when the wing nut 34 is tightened.

An additional guide roller 40 may be provided if desired, to reduce frictional resistance of material which may bear against the arm 22 of the frame 12. This guide roller 40 is disposed upon a guide tab 42 which extends outwardly (i. e., away from the channel 24 between the two arms 20 and 22) from the uppermost end 44 of the second frame arm 22. The guide tab 42 is orthogonal to the arms 20/22, and thus the axis of the guide roller 40 is perpendicular to the axes of the rollers 36, as defined by the roller support member 30.

Figure 3:
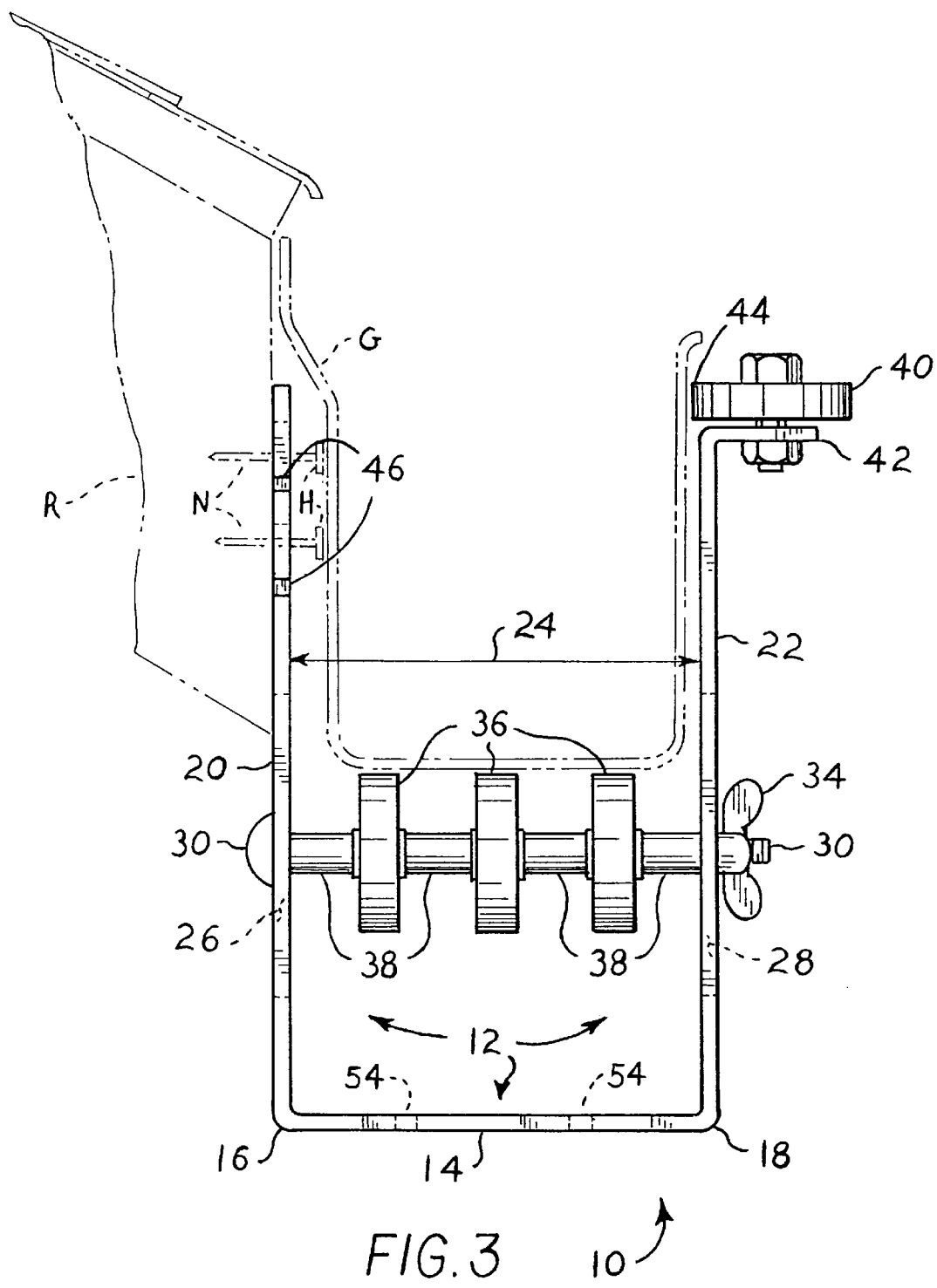
FIG. 3 is a front elevation view of the support in use, showing the relationship between the support, building structure, and construction material supported by the present support.

The guide roller 40 may be of the same type and diameter (i.e., on the order of 1⅞ inch diameter, although other sizes may be substituted) as that of the support rollers 36, and is preferably mounted on the guide tab 42 such that the guide roller 40 outer circumference 44 extends inwardly slightly beyond the inner edge of the second frame arm 22, and is thus disposed slightly above the construction material support channel 24 between the first and second frame arms 20 and 22, as shown in the front elevation view of FIG. 3. This arrangement results in the side of any material which may be supported within the frame channel 24, riding against the guide roller 40 rather than bearing against the inner surface of the second frame arm 22, thus precluding any structural or cosmetic damage to the material being held within the support 10 as it passes laterally therethrough. It will be seen that damage would likely be restricted to cosmetic effects, and thus a similar guide roller on the opposite first arm is not required, as the adjacent material is not exposed when installed.

The present construction material support 10 is temporarily installed to a structure to provide for the support of the otherwise free end of an elongate article of building material, as discussed further above. Accordingly, it is necessary to provide some temporary means of quickly but securely attaching the support 10 to a building structure for the short amount of time required, and also to quickly and easily remove the support 10 from the structure when it is no longer needed at that particular point.

Accordingly, a plurality at least two parallel fastener slots 46 are provided in the first frame arm 20, extending upwardly and inwardly partially across the arm 20 from the first edge 48 of the arm 20. These slots 46 are preferably on the order of ⅛ inch across, to provide clearance over the shank of a nail without allowing the support to pass over the wider nail heads. This enables the support 10 to be temporarily suspended from a like number of nails N or other suitable fasteners (screws, etc., but nails N would be the preferred means in most cases), as needed.

The nails N or other fasteners are partially driven into the structure (e. g., fascia board F, as shown in FIG. 1, or the end of a rafter R, as shown in FIGS. 2 and 3) , with their heads H remaining slightly spaced from the structure. The first arm 20 of the support 10 hooked over the shanks of the nails N, behind the heads H, by means of the slots 46. The support 10 is then moved downwardly to hook the support 10 on the nails N or fasteners. The support 10 is removed by reversing the procedure, and the nails N may be driven home after removal of the support 10.

With the addition of some additional means of mounting the present support 10 to some other structure, its versatility may be increased even further. It will be seen that the present support 10 may be used to support materials (long boards, gutters, pipes for plumbing, electrical conduit, pvc pipe, etc.) for cutting them to a desired length, if some means were provided to mount the support 10 to an adequate structure for such work. Also, the present support 10 will be seen to provide an excellent means of holding or supporting such elongate materials for storage in a shop, work vehicle, or other environment, as desired.

Figure 4:
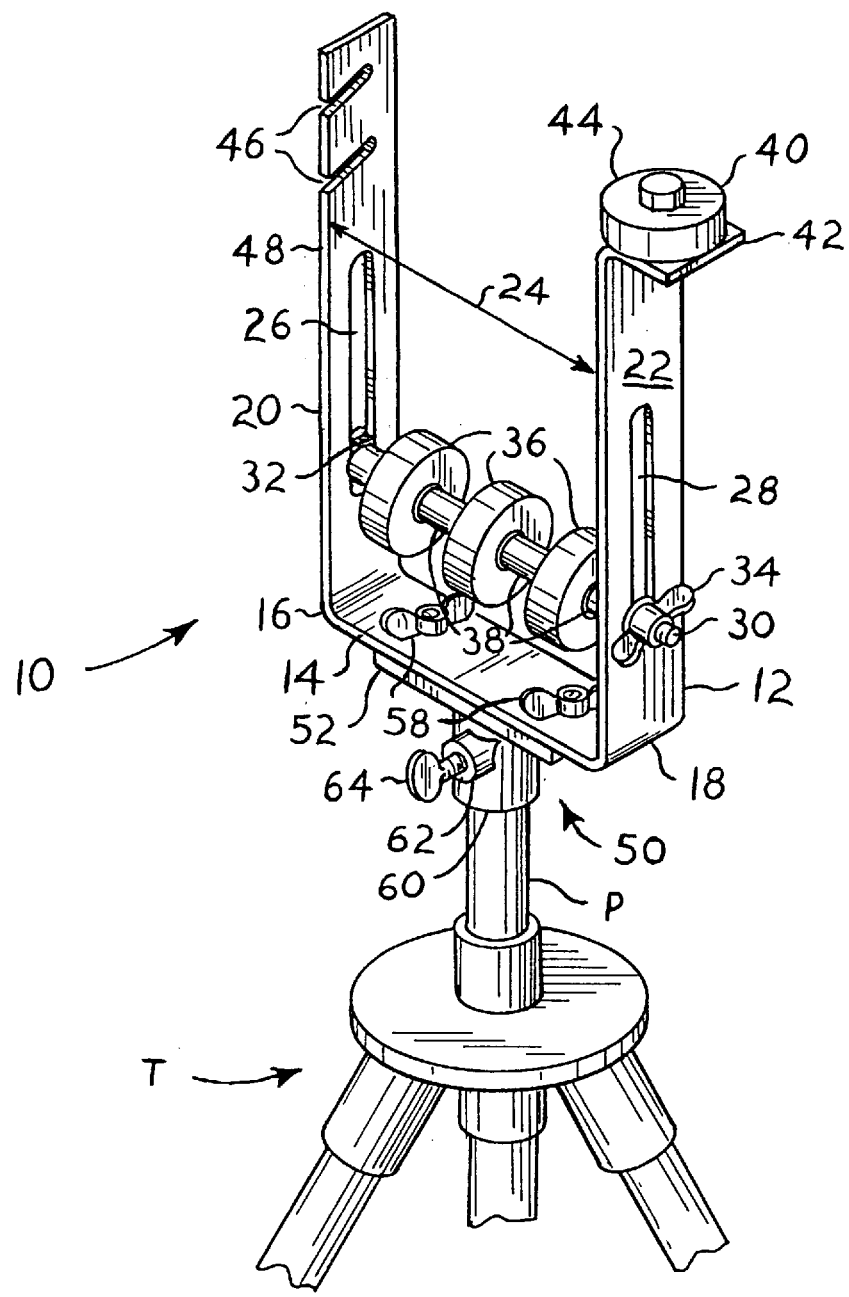
FIG. 4 is a perspective view of the present support with a mounting bracket installed therebeneath for attachment of the support to a tripod.
Figure 5:
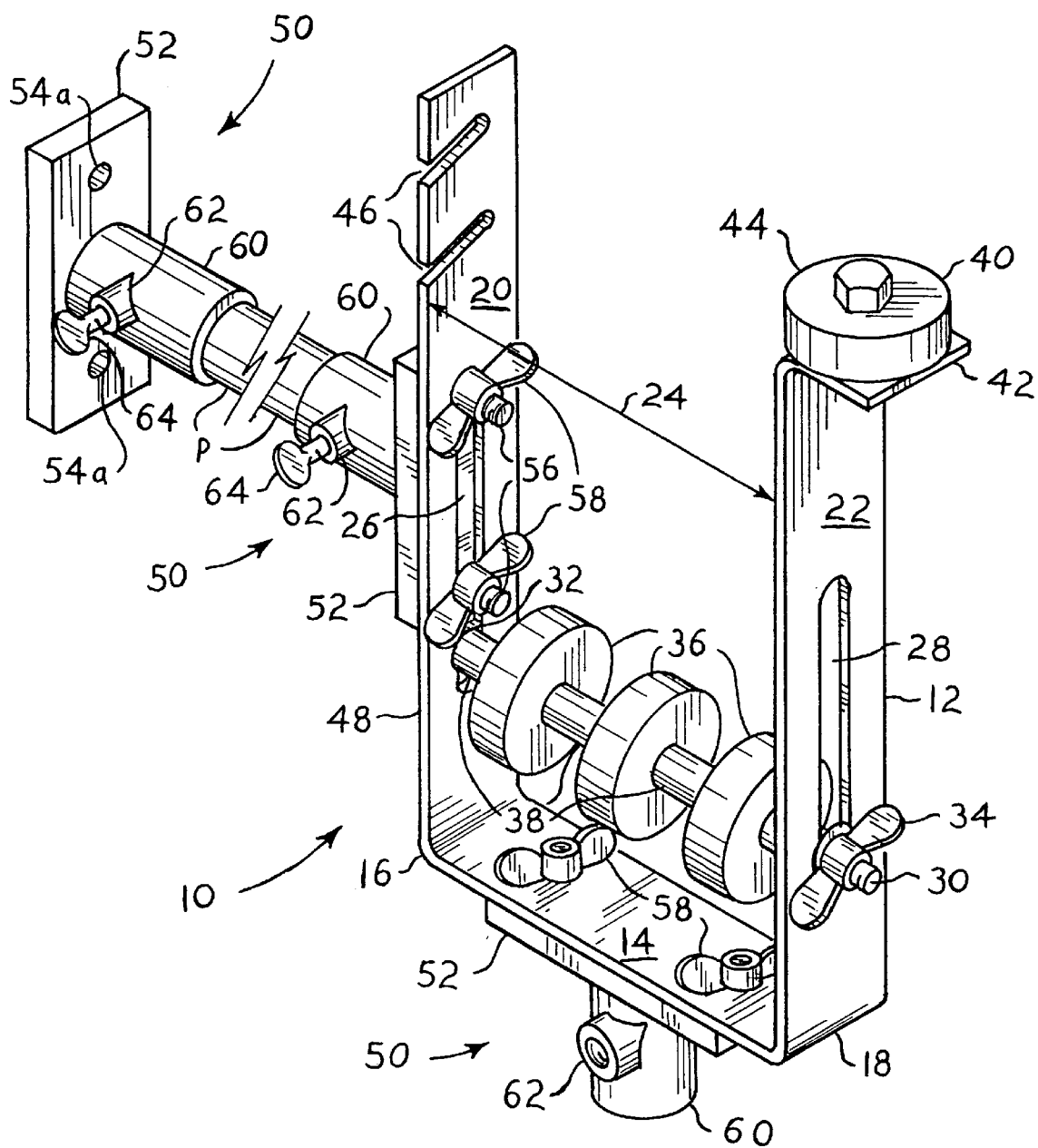
FIG. 5 is a perspective view of the present support with a mounting bracket installed on one side thereof for attachment of the support to a wall structure.

FIGS. 4 and 5 disclose a removable mounting bracket(s) 50, which may be used with the support 10 to secure it temporarily to some other structure, where the use of nails is not suitable. Each bracket 50 has a flat base plate 52 which is removably securable to the frame 12, e. g., by means of holes 54 through the frame base 14 and the adjustment slots 26/28 in the respective frame arms 20/22. The base plate 52 may incorporate corresponding conventional holes or passages 54a, as shown in FIG. 5, and appropriate threaded fasteners 56 (shown in the side mounting of FIG. 5) which may be secured using wing nuts 58, similar to the wing nut 34 used to lock the adjustable roller support arm 30. Additional conventional ancillary hardware, such as washers, lock washers, etc., are not shown, but are incorporated as required. Each base plate 52 has a section of tube or pipe welded or otherwise suitably secured thereto, comprising an attachment component 60 to secure the mounting bracket 50 and attached support 10 to another object.

The attachment component pipe 60 preferably has a threaded hole or boss 62 in the side thereof, used to secure the mounting bracket 50 to a mating section of pipe or tube P using a locking threaded fastener, such as the thumb screw 64 of FIG. 4, or other suitable fastener. By temporarily securing a mounting bracket 50 to the frame base 14 as described above, the present support 10 may be secured atop some other structure or support, such as the tripod T of FIG. 4, by means of a mating section of pipe or tube of appropriate diameter to fit within the attachment pipe component 60 of the mounting bracket 50. Such an arrangement is most convenient as a support for cutting or working on elongate materials, such as gutters, pipe, etc., as required according to the job at hand.

It will further be seen that the adjustment slots 26/28 in the respective frame arms 20/22 may also be used to attach a mounting bracket 50 temporarily to one of the arms 20/22 of the support 10, as shown in FIG. 5. The attachment is essentially as described above for the attachment of a mounting bracket 50 to the frame base 14, using fasteners 56 and wing nuts 58, or other suitable means. The lateral attachment of a mounting flange 50 to one of the frame arms 20/22, permits the support 10 to be secured to and extend laterally from a generally vertical support surface, such as a wall or the like. Another mounting bracket 50 may be secured to the wall (not shown), with another section of pipe P, cut to length as desired, used to join the wall mounted bracket and the support mounted bracket. This arrangement is very handy for the storage of various elongate articles, such as gutters, boards, pipe, etc.

In summary, the present support for construction material 10 will be seen to provide significant assistance for the worker who is installing elongate construction materials at a building site, particularly for such materials which are used well above ground level, such as fascia boards, gutters, etc. The worker need only temporarily nail or otherwise secure one or more of the present supports 10 in place, using the existing fascia board, rafter ends, or other convenient structure, and use the temporarily placed support(s) 10 for the support of the distal end, and possibly intermediate points, of the material being installed as the worker secures the working end permanently in place, as shown in FIG. 1. The worker may then proceed along the length of the material being installed, removing the temporarily installed support(s) as they are reached. Thus, a single worker using the present support(s) 10, may accomplish work which normally requires two or more persons to complete A disclosure of the use of the present supports 10 in the working or storage of elongate materials has also been provided, as shown in FIGS. 4 and 5. One or more mounting brackets 50 may be secured to the frame base 14 and/or one (or both) of the frame arms 20 and 22, as described further above. The support 10 may then be secured to another article, such as the tripod T of FIG. 4, for work on material supported thereby, or two or more such supports 10 may be secured to a wall structure (such as the interior of a work van or other vehicle), using pairs of opposed brackets 50 and an intermediate length of pipe P, as shown in FIG. 5.

Whatever the environment of use for the present support 10, and/or its mounting bracket(s) 50, the device will be seen to have significant utility and to prove most valuable for persons engaged in the construction trade. The present support 10, and associated mounting bracket(s) 50, will quickly pay for themselves in terms of reduced labor costs during construction, as well as reduced wear and tear on materials during handling, provided by the low friction roller means within the frame 12 of the support 10. The roller means also provides for ease of withdrawal of elongate materials from the support 10, when the support 10 is used as a storage rack for such materials. In short, the present support 10, along with the associated mounting brackets 50, provide considerable versatility for the person engaged in the building trade.

It is to be understood that the present invention is not limited to the sole embodiments described above, but encompasses any and all embodiments within the scope of the following claims.

I claim:

1. A support for construction material, comprising:

a generally U-shaped frame having a flat, planar base with a first end and a second end opposite said first end;

said first end of said base having a flat, planar first frame arm extending upwardly therefrom, and said second end of said base having a flat, planar second frame arm extending upwardly therefrom, with said first frame arm and said second frame arm being parallel to one another and defining a construction material support channel therebetween;

said second frame arm includes an uppermost end having a guide tab extending outwardly therefrom said guide tab including low friction construction material guide means disposed thereon;

each said frame arm including an adjustment slot therein, with each said slot being parallel to one another;

a construction material support member adjustably secured between and through each said adjustment slot, said support member extending between each said frame arm and spanning said construction material support channel and providing for the adjustable support of construction material thereupon;

said support member further including low friction construction material support means disposed thereon, providing for the ease of lateral movement of construction materials between first frame arm and said second frame arm and precluding frictional damage to construction material supported by said support member;

said low friction guide means comprises at least one guide roller having an axis generally perpendicular to said support member, said guide roller including an outer circumference extending inwardly past said second frame arm and slightly above said construction material support channel disposed between said first frame arm and said second frame arm, and;

said first frame arm including temporary structure attachment means disposed therein.

2. The support for construction material according to claim 1, wherein:

said low friction construction support material means of said support member, comprises a plurality of rollers disposed along said support member to provide for the low friction lateral movement of material through said frame.

3. The support for construction material according to claim 2, wherein:

said rollers include bushings therebetween, providing for substantially equal spacing of said rollers from each said frame arm and from one another.

4. The support for construction material according to claim 1, wherein:

said first frame arm has a first edge, and said temporary structure attachment means of said first frame arm comprises at least two fastener slots extending from said first edge of said first frame arm, and partially across said first frame arm.

5. The support for construction material according to claim 4, wherein:

said fastener slots are angled upwardly and inwardly from said first edge of said first frame arm, and are parallel to one another.

6. The support for construction material according to claim 1, including:

at least one mounting bracket removably attachable to said frame.

7. The support for construction material according to claim 6, wherein:

said mounting bracket comprises a flat base plate removably attachable to said frame, said base having a tubular attachment component permanently secured thereto and extending therefrom and providing for the removable attachment of said mounting bracket and said frame to another article.

8. The support for construction material according to claim 1, wherein:

at least said frame and said construction material support member are formed of steel.

9. A support for construction material, comprising:

a generally U-shaped frame having a flat, planar base with a first end and a second end opposite said first end;

said first end of said base having a flat, planar first frame arm extending upwardly therefrom, and said second end of said base having a flat, planar second frame arm extending upwardly therefrom, with said first frame arm and said second frame arm being parallel to one another and defining a construction material support channel therebetween;

said second frame arm includes an uppermost end having a guide tab extending outwardly therefrom, said guide tab including low friction construction material guide means disposed thereon;

each said frame arm including an adjustment slot therein, with each said slot being parallel to one another;

a construction material support member adjustably secured between and through each said adjustment slot, said support member extending between each said frame arm and spanning said construction material support channel and providing for the adjustable support of construction material thereupon;

said support member further including low friction construction material support means disposed thereon, providing for the ease of lateral movement of construction materials between first frame arm and said second frame arm and precluding frictional damage to construction material supported by said support member;

said first frame arm including temporary structure attachment means disposed therein;

said low friction guide means comprises at least one guide roller having an axis generally perpendicular to said support member, said guide roller including an outer circumference extending inwardly past said second frame arm and slightly above said construction material support channel disposed between said first frame arm and said second frame arm, and:

said support further including at least one mounting bracket removably attachable to said frame.

10. The support for construction material according to claim 9, wherein:

said low friction construction support material means of said support member, comprises a plurality of rollers disposed along said support member to provide for the low friction lateral movement of material through said frame.

11. The support for construction material according to claim 10, wherein:

said rollers include bushings therebetween, providing for substantially equal spacing of said rollers from each said frame arm and from one another.

12. The support for construction material according to claim 9, wherein:

said first frame arm has a first edge, and said temporary structure attachment means of said first frame arm comprises at least two fastener slots extending from said first edge of said first frame arm, and partially across said first frame arm.

13. The support for construction material according to claim 12, wherein:

said fastener slots are angled upwardly and inwardly from said first edge of said first frame arm, and are parallel to one another.

14. The support for construction material according to claim 9, wherein:

said mounting bracket comprises a flat base plate removably attachable to said frame, said base having a tubular attachment component permanently secured thereto and extending therefrom and providing for the removable attachment of said mounting bracket and said frame to another article.

15. The support for construction material according to claim 9, wherein:

at least said frame and said construction material support member are formed of steel.

\* \* \* \* \*